(12) United States Patent
Fleming et al.

(10) Patent No.: US 6,285,001 B1
(45) Date of Patent: *Sep. 4, 2001

(54) METHOD AND APPARATUS FOR STEP AND REPEAT EXPOSURES

(75) Inventors: Patrick R. Fleming, Oakdale; Andrew J. Ouderkirk, Woodbury; Eric J. Borchers, Lakeland, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,822

(22) Filed: May 5, 1997

Related U.S. Application Data (62) Division of application No. 08/429,302, filed on Apr. 26, 1995, now abandoned.

(51) Int. Cl.[7] .................................................... B23K 26/38
(52) U.S. Cl. ................................ 219/121.72; 219/121.73
(58) Field of Search ........................... 219/121.6, 121.68, 219/121.69, 121.73, 121.78, 121.82, 121.85, 121.72; 264/400; 216/65; 427/555; 438/940; 430/322, 323, 316

(56) References Cited

U.S. PATENT DOCUMENTS

| Re. 33,947 | 6/1992 | Shinohara . |
| 4,508,749 | 4/1985 | Brannon et al. . |
| 4,752,668 | 6/1988 | Rosenfield et al. . |
| 4,786,358 | 11/1988 | Yamazaki et al. . |
| 4,822,975 | 4/1989 | Torigoe ........................... 219/121.85 |
| 4,842,782 | 6/1989 | Portney et al. . |
| 4,842,784 | 6/1989 | Portney et al. . |
| 4,856,513 | 8/1989 | Muller . |
| 4,894,115 * | 1/1990 | Eichelberger et al. ..... 219/121.69 X |
| 4,909,818 | 3/1990 | Jones . |

(List continued on next page.)

FOREIGN PATENT DOCUMENTS

| 572798 * | 2/1976 | (CH) ................................. 219/121.7 |
| 0 079 473 | 5/1983 | (EP) . |
| 0 346 116 | 12/1989 | (EP) . |
| 0 417 952 | 3/1991 | (EP) . |
| 0 479 355 | 4/1992 | (EP) . |

(List continued on next page.)

OTHER PUBLICATIONS

Gower et al., "Excimer laser projector for materials processing applications" in: Fogarassy et al., "Laser Ablation of Electronic Materials", (Elsevier Science Publishers, 1992), pp. 255–262.*

Tonshoff et al.; "Micromachining Using Excimer Lasers", Annals of the CIRP; vol. 42/1/1993.

Wolbold et al.; "Polymer ablation with a high–power excimer laser tool", Microelectronic Engineering 20 (1993) 3–14.

(List continued on next page.)

Primary Examiner—Samuel M. Heinrich
(74) Attorney, Agent, or Firm—Stephen W. Buckingham (57) ABSTRACT

An excimer laser projection ablation system provides less than the necessary amount of illumination to a substrate to completely ablate a structure. The system then moves the substrate a distance less than the image field at the substrate and provides an additional level of illumination. The system continues to move the substrate and provide additional illumination until the structures are fully ablated. The method and system for performing an improved step and repeat process preferably are used to create uniform repeating structures or three-dimensional structures.

3 Claims, 9 Drawing Sheets

U.S. PATENT DOCUMENTS

| | | |
|---|---|---|
| 4,970,366 | 11/1990 | Imatou et al. . |
| 5,018,164 | 5/1991 | Brewer et al. . |
| 5,053,171 | 10/1991 | Portney et al. . |
| 5,061,342 | 10/1991 | Jones . |
| 5,064,989 | 11/1991 | Lemelson . |
| 5,066,357 * | 11/1991 | Smyth, Jr. et al. ......... 219/121.69 X |
| 5,160,823 * | 11/1992 | Bennin et al. ................ 219/121.68 |
| 5,170,191 | 12/1992 | Jones . |
| 5,171,965 * | 12/1992 | Suzuki et al. .................... 219/121.6 |
| 5,179,262 | 1/1993 | Portney et al. . |
| 5,194,316 | 3/1993 | Horner et al. . |
| 5,208,818 * | 5/1993 | Gelbart et al. ....................... 347/224 |
| 5,223,693 | 6/1993 | Zumoto et al. . |
| 5,240,553 | 8/1993 | Jones . |
| 5,254,811 | 10/1993 | Ludden et al. . |
| 5,257,706 | 11/1993 | McIntyre . |
| 5,262,718 | 11/1993 | Svendsen et al. . |
| 5,294,293 | 3/1994 | Jones . |
| 5,296,673 | 3/1994 | Smith . |
| 5,321,227 | 6/1994 | Fuchs et al. . |
| 5,326,956 * | 7/1994 | Lunney ........................... 219/121.75 |
| 5,362,940 * | 11/1994 | MacDonald et al. ........... 219/121.68 |
| 5,368,900 * | 11/1994 | Jelley et al. .................... 219/121.69 |
| 5,406,042 * | 4/1995 | Engelfriet et al. .............. 219/121.68 |
| 5,461,212 * | 10/1995 | Seiler et al. .................... 219/121.68 |
| 5,514,850 * | 5/1996 | Miyazaki et al. ............... 219/121.69 |

FOREIGN PATENT DOCUMENTS

| | | |
|---|---|---|
| 0 500 110 | 8/1992 | (EP) . |
| 2 692 067 | 12/1993 | (FR) . |
| 91 01514 | 2/1991 | (WO) . |
| 0 079 473 | 11/1994 | (WO) . |
| 94 25259 | 11/1994 | (WO) . |
| 94 29071 | 12/1994 | (WO) . |

OTHER PUBLICATIONS

Dyer et al., "Development and origin of conical structures on XeCl laser ablated polyimide", Appl. Phys. Lett.; vol. 49, No. 8: Aug. 25, 1986.

von Gutfeld et al.: "Electrostatic collection of debris resulting from 193 nm laser etching of polyimide", Appl. Phys. Lett.; vol. 51, No. 1, Jul. 6, 1987.

Taylor et al.; "The effect of debris formation on the morphology of excimer laser ablated polymers"; J. Appl. Phys.; vol. 64; No. 5; Sep. 1, 1988.

Koren et al., "$CO_2$ Laser Cleaning of Black Deposits Formed During the Excimer Laser Etching of Polyimide in Air"; Appl. Phys. B 45, 45–46 (1988).

Taylor et al., "The effect of debris formation on the morphology of excimer lase ablated polymers", J. Appl. Phys., vol. 64, No. 5, Sep. 1, 1988.

Zimmer et al.; "Excimer Laser Machining for the Fabrication of analogous Microstructures"; 3rd International Conference on laser ablation; May 22–26, 1995.

* cited by examiner

METHOD AND APPARATUS FOR STEP AND REPEAT EXPOSURES

This is a division of application Ser. No. 08/429,302 filed Apr. 28. 1995 now abandoned.

FIELD OF THE INVENTION

The present invention relates generally to laser ablation technology. More particularly, it relates to an improvement to step and repeat exposure processes using excimer laser ablation of substrates to improve the uniformity of repeating microstructures on an ablated substrate or to create three-dimensional microstructures on an ablated substrate.

BACKGROUND OF THE INVENTION

Laser ablation has long been used in the ophthalmic and semiconductor fields. In the past, for example, photolithographic processes were used to produce the vias that connect different levels of circuitry of semiconductor chips. Laser ablation processes have replaced the photolithographic processes in some instances and are now used for ablating the via patterns. In the optical field, on the other hand, laser ablation has been used for shaping contact lenses, such as smoothing their surfaces.

Figure 1A:
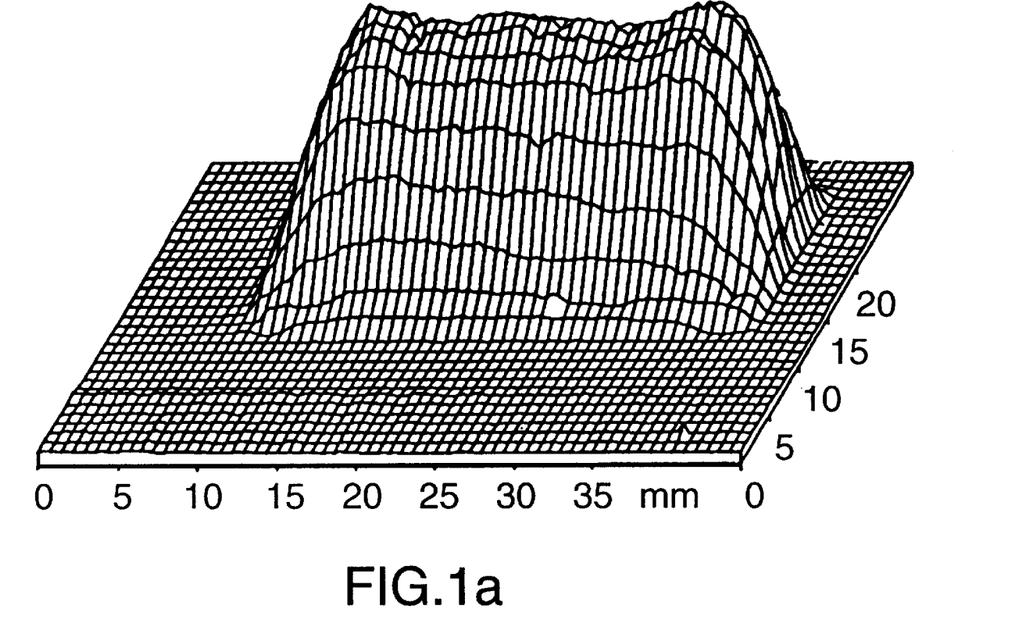
FIG. 1a is a graphical representation of the energy profile of a typical excimer laser beam in cross-section.

Many obstacles are present when using laser ablation processes, such as spot writing with a shaped beam, shadow mask systems, projection mask systems and phase mask systems. For those systems that use a mask, it is expensive and inefficient to provide perfectly uniform illumination of the mask. The distributions of the beam intensity from an excimer laser is roughly rectangular in cross-section. An ideal beam has a top-hat profile in the long dimension and a Gaussian cross-section in the short dimension. The non-uniform beam intensity can create nonconformities in an ablated substrate. FIG. 1a is a graphical representation of the energy profile of a typical excimer laser beam in cross-section. While the intensity of the beam is substantially uniform in the center portions of the beam cross-section, the intensity of the beam drops off near the beam edges. The nonuniformity of the beam intensity can translate to non-uniformities in the ablated materials, such as less material removal and formation of spurious posts due to contamination in the material being ablated in lower intensity areas and straighter walls in the higher intensity areas. Therefore, methods and apparatuses have been developed to overcome the nonuniformities inherent in the beam intensity.

Figure 1B:
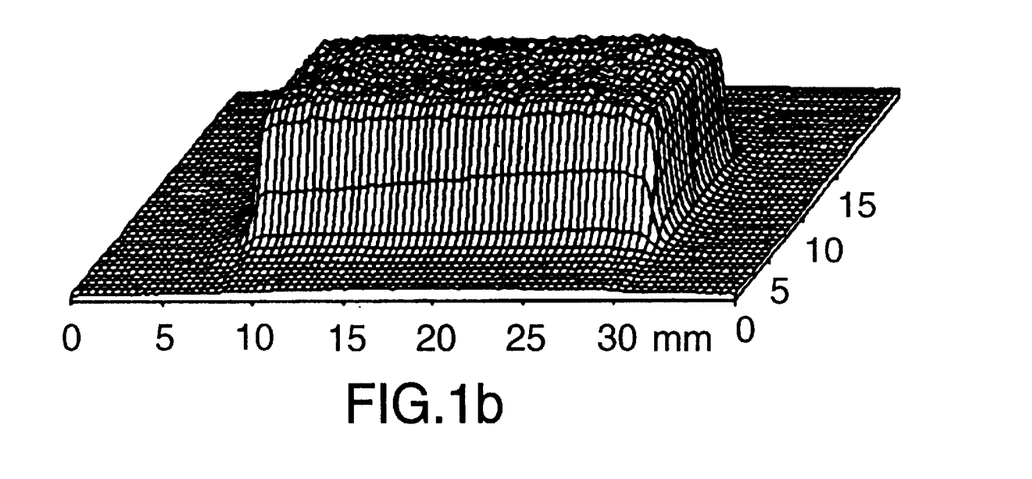
FIG. 1b is a graphical representation of the energy profile of the excimer laser beam in FIG. 1a after passing through a beam homogenizer.

Beam homogenizer systems have been developed to improve the uniformity of the cross-section of laser beams. FIG. 1b is a graphical representation of the energy profile of the excimer laser beam shown in FIG. 1a in cross-section after passing through a beam homogenizer. Beam homogenizers output a substantially constant energy beam across a mask plane, thereby providing more even ablation across a substrate. Beam homogenizer systems included in laser ablation systems increase the cost of the laser ablation system, however, and therefore can be undesirable in lower cost systems. Moreover, beam homogenizer systems are less efficient than non-homogenized beams due to energy losses in the system and require more pulses to ablate the same amount of material because of the lower pulse energy.

Laser ablation systems, such as projection systems utilizing lenses, have additional problems creating uniform morphologies. Projection laser ablation systems use a projection lens to transfer an image of the desired pattern from the mask plane to the substrate plane. This image transfer is never perfect due to spherical and chromatic aberrations, coma, astigmatism, field curvature and distortion, and other higher order effects on the wavefront. These distortions can cause nonuniformities in the ablated substrates, thereby reducing the precision available to create uniform, micromachined surfaces. To partially overcome lens aberrations, higher quality, higher cost lenses may be used in projection systems. These high cost lenses, however, cannot be justified in all projection systems.

The laser ablation process can generate a substantial amount of debris from the ablated substrate, thereby causing additional obstacles to precision machining or uniform morphologies in the ablated substrate. When features are closely spaced and a large area is to be covered, some debris typically falls on areas that are to be later ablated. Substrates that are covered with a large amount of debris do not have the same ablation characteristics as clean substrates or substrates that are covered with only a small amount of debris. Particularly when ablating larger features, the generated debris can cause interference with the current or subsequent ablation sites. Debris removal systems have been developed for use with laser ablation systems to remove the debris remaining on the substrates to be ablated to minimize the amount of debris the laser beam must penetrate to sufficiently ablate the surface of the substrate. One method of debris removal utilizes assist gases, such as helium or oxygen. Performing the ablation in a vacuum also reduces debris, but further adds complexity to the system. With assist gases or vacuums incomplete debris removal can occur, particularly with larger features, thereby resulting in residual formations.

Because a very high fluence is required to ablate material from a substrate, the area of the image field at the substrate is typically quite small, on the order of less than one square centimeter. Typical step and repeat processes allow production of a large number of images, the images being far removed from each other, such that debris produced by the process and nonuniformities between the images are not an issue. In order to cover large areas on a substrate, however, step and repeat processes or a mask scanning operations may be performed. In a step and repeat process, a first image is exposed to the necessary number of laser beam pulses such that the substrate is ablated to the desired depth. Then, the substrate is moved such that an unexposed area of the substrate is in the image field, preferably so a second image may be exposed immediately adjacent the first image. This process is repeated until the desired area is covered with the repeated images.

Figure 2:
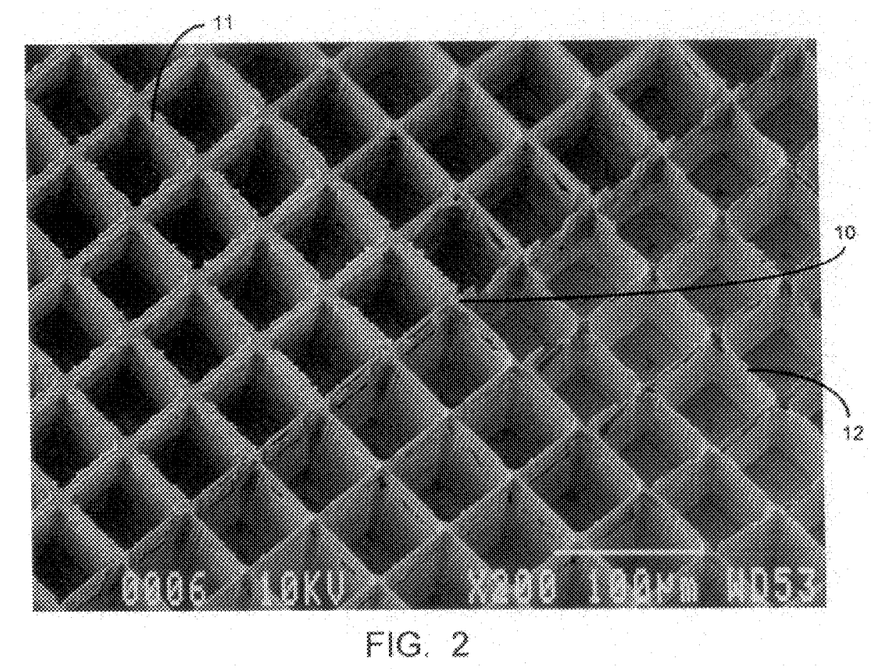
FIG. 2 is a picture of a scanned electron-beam microscope photograph of the intersection of four images of repeating structures using a step and repeat process.

When step and repeat processes are used to cover large areas of a substrate, however, nonuniformities become an issue because it is difficult to hide the intersections between adjacent images over a large area of the substrate. FIG. 2 shows an enlarged perspective view of a substrate having a pattern created with step and repeat imaging. The repeating pattern of square holes on the substrate may be produced by ablating adjacent square images having the repeating pattern of square holes. Intersection point 10 is the intersection of four images. In one image, walls 11 underexposed, thereby leaving polyimide residue on the top of the walls. In a second image, walls 12 were overexposed, thereby removing too much polyimide and leaving incomplete walls. Very slight differences in a pattern caused by, for example, the aforementioned nonhomogeneous beam profile, minor distortion in the image or attempting to ablate through the debris left by ablating the adjacent image is visible to the human eye. In mask scanning operations, a large area mask, with a pattern on it corresponding to the entire area to be covered is used and the mask is moved synchronously with the substrate. These large area masks, however, are very expensive to create.

Laser ablation systems can also be used for micromachining. Microelectronics and micromechanics require production technologies to produce small structures and small parts. Laser ablation is well suited for precision production of small, precision structures, particularly applications requiring drilling, cutting, material removal and surface modification of materials. Excimer lasers have been used to machine metals, ceramics and polymers when small structures are required. For example, in a spot writing system, an excimer laser may be used as a stylus, where the laser beam has an ablating resolution of one micron. While this type of single spot writing system allows ablation of three-dimensional structures, the laser typically operates around 2000 Hz. The rate at which the surface area is ablated is slow, thereby making this method impractical for covering large areas.

To ablate larger three-dimensional geometries, the three-dimensional geometry may be separated into slices parallel to the x-y plane. The thickness of each slice is equivalent to the removal depth of one or more laser pulses. Beginning with the largest mask, the surface associated with each slice is removed with a single mask. The process is continued with smaller and smaller mask size until the three-dimensional geometry has been created. The aforementioned method of creating three-dimensional structures are either expensive, have a limited application or are inefficient. For example, precision control mechanisms exist for moving the laser beam or the mask to precisely position the beam or mask relative to the substrate. Such accurate positioning allows precise ablation of a slice of the three-dimensional structure. Other costly and inefficient methods place the entire pattern on a single mask and shutter off unused portions of the mask, thereby not using all the light from the laser or require multiple masks to create the entire three-dimensional pattern.

SUMMARY OF THE INVENTION

The present invention provides a method and apparatus for exposing a substrate to patterned radiation. The methods of the present invention improve the uniformity of repeating structures on a substrate as well as allow production of three-dimensional structures. One method modifies a step and repeat process by providing less than the necessary level of illumination to the substrate to create a structure and providing the remaining amount of illumination at one or more later times. A second method modifies a step and repeat process by moving a substrate a distance less than the image field size between each exposure of the substrate to illumination. Alternatively, the second method exposes an area of the substrate to light passing through a plurality of portions of a patterned mask, each exposure occurring at different times. A system is also described for performing the methods.

BRIEF DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 3:
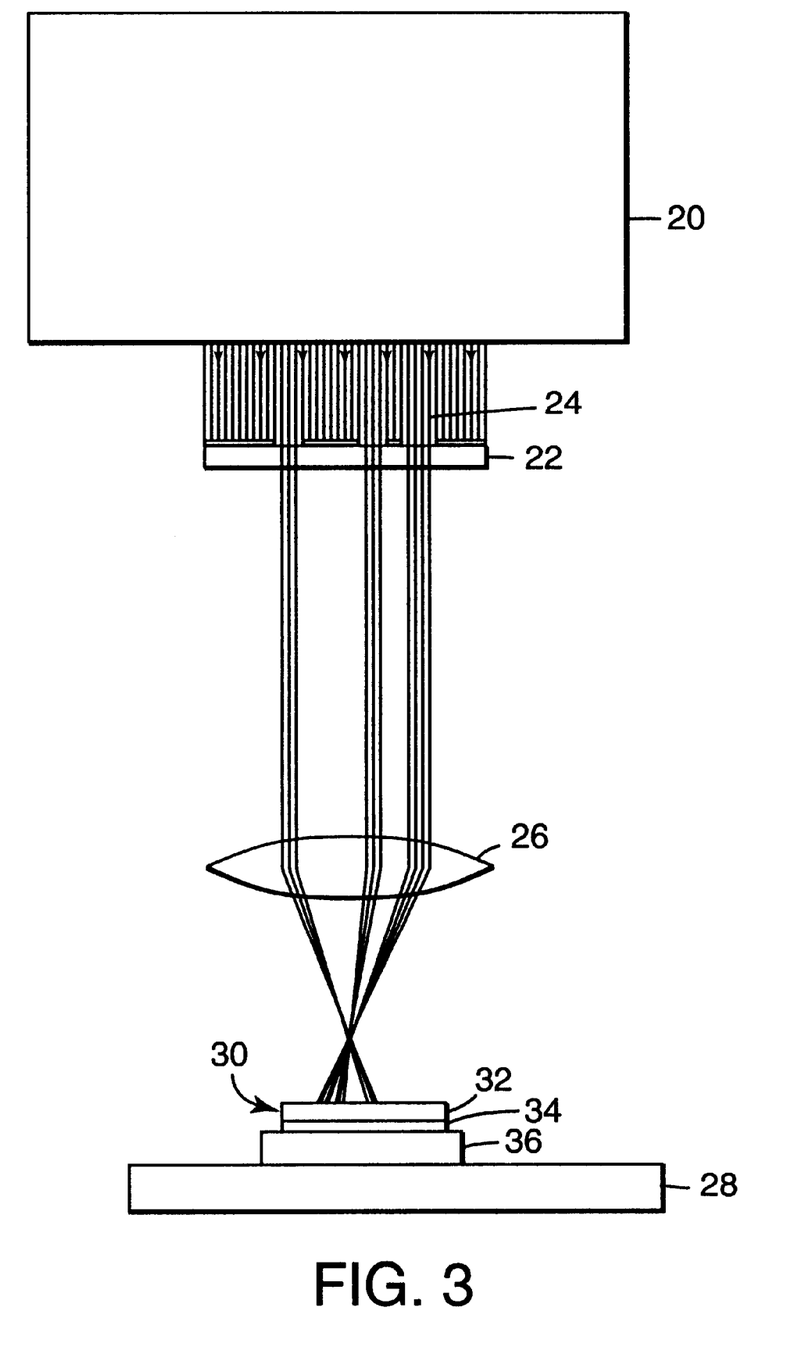
FIG. 3 shows the system of the present invention.

FIG. 3 shows a laser ablation system of the present invention. The laser ablation system is preferably a laser projection ablation system utilizing a patterned mask, although a shadow mask system or phase mask system could be used. Projection imaging laser ablation is a technique for producing very small parts or very small structures on a surface of a substrate, the structures having sizes on the order of between one micron to several millimeters, whereby light is passed through a patterned mask and the pattern is imaged onto a substrate. While the present system is described using lasers, the illumination provided by the laser can be any kind of light, such as infrared or x-ray sources. Moreover, the present invention can be applied using sources that produce other types of radiation. Material is removed from the substrate in the areas that receive light.

Laser 20 is preferably a KrF excimer laser emitting a beam with a short wavelength of light, preferably on the order of 248 nm. Those skilled in the art will readily recognize that any type of excimer laser may be used, such as $F_2$, ArF, KrCl, or XeCl type excimer lasers. An excimer laser is preferred because an excimer laser can resolve smaller features and causes less collateral damage than lasers such as $CO_2$ lasers, which emit beams with a wavelength of approximately 10,600 nm and can be used with most polymers and ceramics that are transparent to lasers that are usually used for processing metals, such as Neodymium doped Yttrium Aluminum Garnet (Nd:YAG) lasers. Excimer lasers are further preferred because at UV wavelengths, most materials, such as polymers, have high absorption. Therefore, more energy is concentrated in a shallower depth and the excimer laser provides cleaner cutting. Excimer lasers are pulsed lasers, the pulses ranging from 5–300 nanoseconds.

Mask 22 is preferably a patterned mask having pattern 24 manufactured using standard semiconductor lithography mask techniques. The patterned portions of mask 22 must be opaque to UV light while the support substrate must be transparent to UV light. In one embodiment, the patterned portions are preferably aluminum while the support substrate for mask 22 is preferably fused silica ($SiO_2$). Fused silica is preferred as a support material because it is one of the few materials that is transparent in the mid and far UV wavelengths. Aluminum is preferred as a patterning material because it reflects mid-UV light. Even more preferred is a fused silica with a patterned dielectric stack on top of it.

Imaging lens 26 may be a single lens or an entire optical system consisting of a number of lenses and other optical components. Imaging lens 26 projects an image of the mask, more specifically, an image of the pattern of light passing through the mask onto the surface of substrate 30. Lenses in optical systems have an optimal magnification of conjugate ratio, the conjugate ratio being the distance from the lens to the mask divided by the distance of the lens to the image. Substrate 30 may be any of a number of metals, ceramics, or polymers. Some inexpensive and clear polymers include polyimide, polyester, polystyrene, polymethymethacrylate and polycarbonate. Substrate 30 may also be a combination of materials, such as shown in FIG. 3, where top layer 32 of substrate 30 is polyimide and bottom layer 34 is copper. Bottom layer 34 may be included for purposes such as an etch stop or to provide support for patterns that would not support themselves if cut through top layer 32.

Table 28 supports and positions ablated substrate 30. Substrate 30 is fixedly supported to table 28, such as by vacuum chuck 36, static electricity, mechanical fasteners or a weight. Table 28 can position substrate 30 by moving substrate 30 on the x, y and z axes as well as rotationally, such as along the z axes. Table 28 can move substrate 30 in steps down to approximately 5 nm, and more typically, approximately 0.1 microns, reproducible to an accuracy of approximately 100 nm. This reproducibility allows a step and repeat process to be used with the patterns to allow ablation of larger areas, on the order of many feet, on substrate 30. Table 28 may be manually positioned or, more preferably, computer controlled. A computer controlled table allows preprogramming of the movement of the table as well as possible synchronization of the table movement with the emission of light from the laser. The table can also be manually controlled, such as with a joystick connected to a computer.

A system similar to the system shown in FIG. 3 can be used to create a repeating pattern using a step and repeat operation that overcomes nonuniformities caused by system limitations such as nonhomogeneous beam profiles, lens distortions and insufficient debris removal. The method of the present invention overcomes these problems to create uniform, repeating structures by exposing each predetermined area on a substrate to many different areas in the image field, thereby allowing the substrate to be exposed to variations in the beam strength and lens distortions within the image field. Moreover, the method does not produce a large amount of debris in each step of the step and repeat operation, thereby preventing a large accumulation of debris and overcoming the problem of debris interference in the imaging process.

Figure 4:
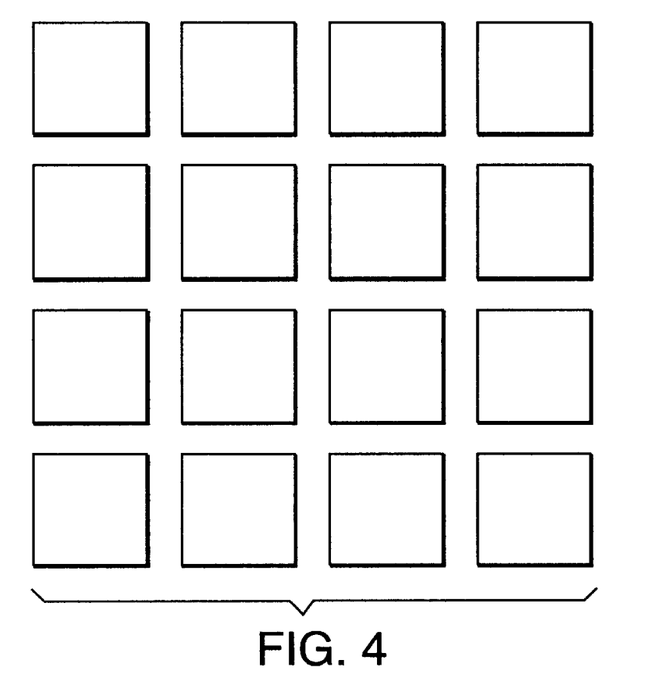
FIG. 4 shows an example of a mask pattern having a repeating square hole pattern.

The mask used with the method of the present invention preferably includes a repeating pattern to be ablated in the substrate for creating a uniform, repeating pattern. While a single structure can be created in some embodiments of the present invention, it is preferable to have at least two full patterns and more preferable to have a significantly larger number of features on the mask. FIG. 4 shows an example of a mask pattern that could be used to ablate a pattern of square holes in a substrate. Those skilled in the art will readily recognize that a number of different shapes and geometries can be repeated in a mask pattern, such as channels, circles, polygons, letters and numbers. Those skilled in the art will further appreciate that the level of repetition need not be to the extent shown in FIG. 4.

The method of the present invention can include two basic process modifications of a typical step and repeat process, each modification able to be used alone, together or in combination with step and repeat process steps. The first modification consists of providing less than the required dose of light to a first image position on the substrate before moving to a subsequent image position on the substrate. This will result in incomplete ablation of the pattern at the first image position. When a pattern is chosen, the number of laser beam pulses necessary to ablate material from the substrate to a sufficient depth to create each feature is determined. For example, if the pattern requires ablating through 50 micron thick polyimide using a KrF excimer laser with a fluence of 800 $mJ/cm^2$, the excimer laser will ablate approximately 0.5 microns of polyimide per pulse. For such a pattern, approximately 100 pulses are necessary to remove sufficient polyimide to reach the required depth. In the first modification to typical step and repeat processes, rather than ablating the entire pattern, which would require 100 pulses from the excimer laser, some fraction of 100 pulses would be provided at a first step. Once the number of necessary pulses to fully ablate a structure is determined, the number of pulses provided at each step is determined. For example, a single pulse could be provided at a first step. Thus, an additional 99 pulses would subsequently be provided at later times to fully ablate the desired structure in that area of the substrate. The exposure is later finished when the same region of the substrate is exposed with light one or more times by the same image pattern with light passing through the same portion of the mask, the same image pattern with light passing through a different portion of the mask, or a different image pattern with light passing through a different portion of the mask. When the same image pattern is used with light passing through a different portion of the mask, the mask must have a pattern of repeating features to create a uniform structure on the substrate. When a different image pattern is used with light passing through a different portion of the mask, the mask must have features that correspond with the incompletely exposed areas of the substrate to create three-dimensional structures. When the exposure is finished with overlapping image patterns, more than one image position is used to fully expose a particular region of the substrate to create the desired structure.

The required strength, or energy/pulse (mJ), of each exposure depends on the substrate material, the desired depth of the ablation, the efficiency of the beam delivery system, and the desired wall angle. A typical excimer laser has a maximum energy of one J/pulse, with a 50% efficiency in the beam delivery system. For a polymer, for example, the threshold strength required for ablation is approximately 50 $mJ/cm^2$, while the most efficient processing strength is 200 $mJ/cm^2$, and a preferred level is on the order of 800 $mJ/cm^2$. Because of the efficiency of most beam delivery systems, typically only between 0.1 $cm^2$ and 0.5 $cm^2$ of the substrate is processed at a time. In the present invention, while it is preferred that the strength of each exposure is the same, in another embodiment, the strength of each series of exposures varies, depending on the requirements of the pattern, such as the depth of the ablation.

Figure 5:
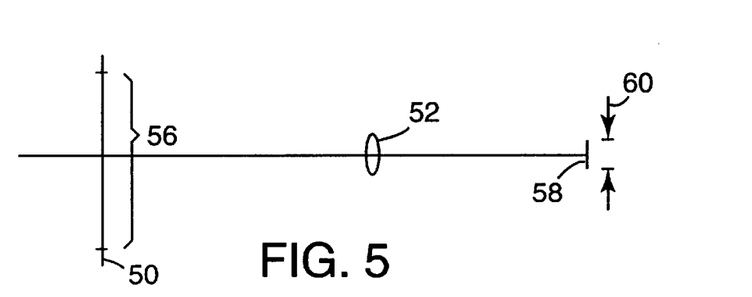
FIG. 5 shows how the size of a mask pattern corresponds with the image field size at the substrate.
Figure 6:
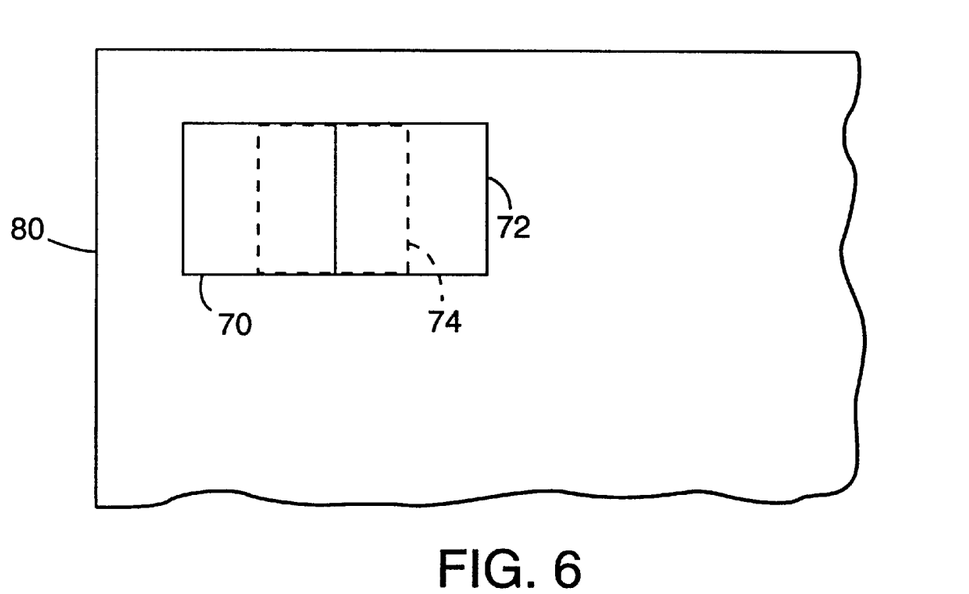
FIG. 6 shows a first method of overlapping repeating features on a mask at an area of the substrate.

The second process modification to the prior art step and repeat process involves moving an image less than one full image pattern dimension. FIGS. 5 and 6 will be used to explain how this process modification can allow different parts of a mask image to expose any one area of the substrate. FIG. 5 is a schematic diagram of a laser projection ablation system having mask 50 and lens 52. Object field size 56 corresponds to the outer dimensions of the pattern on mask 50. At image 58, on the surface of the substrate, image field size 60 corresponds in form with the pattern on mask 50 and in size to the object field size 56 reduced by a ratio as determined by the magnification of lens 52. FIG. 6 shows a portion of substrate 80 which has been exposed to light a plurality of times. The boundaries of first image 70 is shown ablated at a first location of substrate 80, the repeating pattern within first image 70 not shown. In prior art step and repeat processes, after the first image was completely ablated, the image ablated subsequent to first image 70, image 72, would be completely ablated adjacent or nearly adjacent first image 70. In the method of the present application, however, substrate 80 would be moved less than the image field size at the substrate such that second image 74, shown in dotted lines, would have a portion overlapping with first image 70. Consequently, the third ablated image would be image 74. When uniformity of a repeating pattern is the goal of the present invention, incomplete ablation is performed at each step, as described in the aforementioned first process modification. The overlap of aligned repeating patterns in the image allows subsequent exposures to complete the exposure to an area of the substrate.

Figure 7:
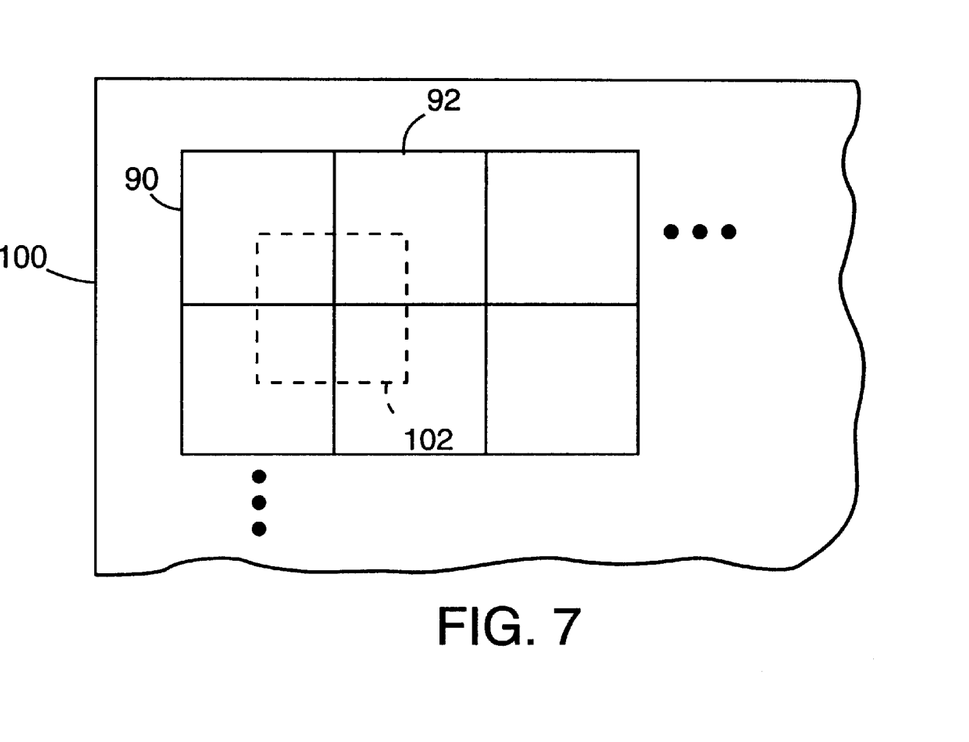
FIG. 7 shows a second method of overlapping repeating features on a mask at an area of the substrate.

In an alternative embodiment of the second modification to step and repeat processes, after first image 90 is ablated, substrate 100 is moved an amount equal to at least the image field size at substrate 100. This is similar to prior art step and repeat processes where second image 92 is adjacent first image 90. When the first modification is used in combination with the second modification, at each step the pattern is only partially ablated into substrate 100. Thus, no overlap occurs in a first series of ablation. In a second series of ablation, however, substrate 100 is moved such that at least a portion of the image field at substrate 100 overlaps an area on substrate 100 previously ablated in the first series of ablation. In FIG. 7, first image of second series of ablation 102, shown in dotted lines, overlaps first image 90, second image 92 as well as two additional images from the first series of ablation. The second series of ablation may proceed similarly to the first series of ablation, wherein each subsequent image does not overlap with a preceding second series image, or it may proceed similarly to the process shown in FIG. 6, where each subsequent image overlaps with a preceding second series image, or it may proceed using a combination of both. Similarly, in FIG. 6, after the first series of overlapping images have been ablated, the next series or next plurality of series of ablated images may proceed with any combination of overlapping and non-overlapping images. When uniformity of a repeating pattern is the goal of the present invention, the first series of ablation preferably covers substantially all of the desired ablated area on the substrate. Moreover, the first series of ablation provide less than the required dosage of light, the remaining required dosage of light provided in subsequent series of ablation.

In a preferred embodiment for ablating uniform repeating structures, both the first modification and the second modification to a step and repeat process are utilized. For example, using a excimer laser projection ablation system as shown in FIG. 3 can be used to create a repeating pattern of square holes. A 6 mm×6 mm mask containing a 46×46 array of elements, or 2116 elements, having a pattern similar to the pattern shown in FIG. 4 may be used as the mask pattern. If ablating a polymer such as polyimide having a thickness of 50 microns, a fluence range of approximately 800 mJ/cm$^2$ is preferred, thereby removing approximately 0.5 microns/pulse. Therefore, approximately 100 exposures are necessary to remove the polyimide for each structure to the desired depth. While it is often preferred to step a single feature between exposures, because only 100 exposures are necessary and 2116 elements exist in the image field in the present example, a single feature step is not preferred. Rather than stepping a single feature, each step may be multiples of features, such as stepping four features horizontally when moving the substrate across a row and five features vertically when moving the substrate across a column.

Figure 8:
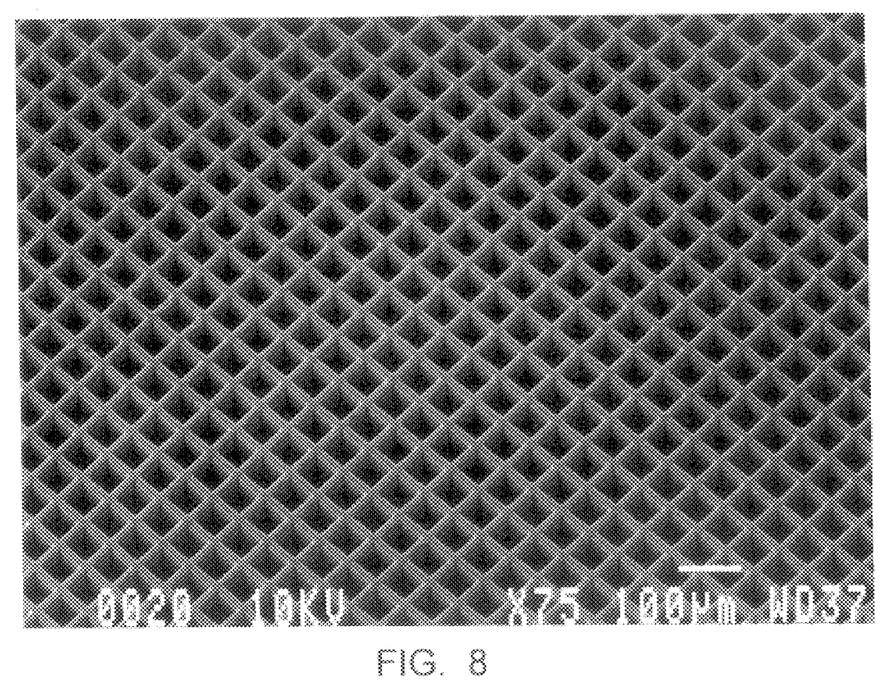
FIG. 8 is a picture of a scanned electron-beam microscope photograph of a plurality of repeating structures created using the method of the present invention.

FIG. 8 shows an enlarged view of a portion of an ablated polyimide substrate using the method described above. In the ablated pattern of FIG. 8, uniformity across the substrate is achieved because the method of the present invention substantially eliminates accumulation of debris on the surface of the polyimide as well as averages out nonuniformities in intensity of the illumination of the mask. The incomplete ablation of the first modification facilitates debris removal. When only one pulse, or only a few pulses, are delivered by the laser before moving the substrate to the next image position, the debris accumulation is small enough that it does not substantially affect the ablation characteristics of the substrate material. In conjunction with the incomplete ablation, the movement of the substrate such that areas of the substrate are exposed to additional illumination during later series of ablation as described in the second modification allows completion of the ablation to the desired depth. The overlapping of image patterns at the substrate distributes the nonuniformities of the illumination of the beam across the entire ablated substrate surface, particularly when the image pattern is stepped a single feature between each incomplete exposure. This distribution exposes each ablated structure to a substantially similar pattern of relatively higher intensity portions of the beam cross-section and relatively lower intensity portions of the beam cross-section. In an embodiment where the image pattern is stepped more than a single feature between each incomplete exposure, such as the example above where the image pattern is stepped four features when moving horizontally and five features when moving vertically, the beam only need be substantially uniform over each 4×5 feature cross-sectional area to achieve uniformity.

Because the relative strength of the beam varies across its cross-section, the order in which each area of a substrate is exposed to a portion of the beam affects the uniformity of the finally ablated features in that area. The quality and result of an exposure varies with respect to the fluence of the beam. For example, higher fluence results in deeper ablation with straighter walls, more effective debris removal and less spurious post formation from contamination in the substrate. Conversely, lower fluence results in shallower ablation, often with some angle in the walls of the ablated feature. If an area of a substrate is exposed to a series of incomplete exposures, each exposure having a different fluence level, the shape of the finally ablated feature would vary depending on the order of the exposures. The wall angle, for example, would vary between different features as well as within a single feature, portions of the walls being more vertical when exposed to a higher fluence level and more angled when exposed to a lower fluence level.

Figure 9:
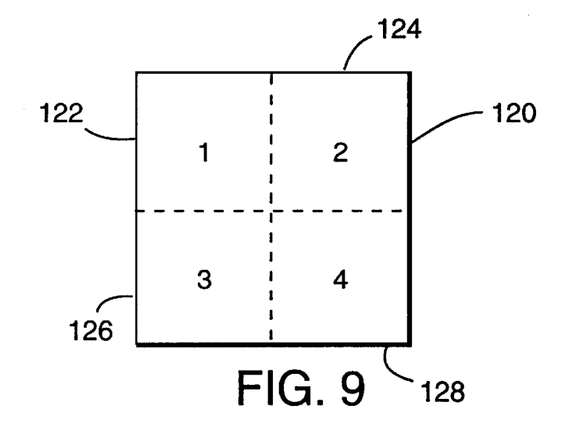
FIG. 9 shows four quadrants of an image field, each quadrant having different fluence.

In the method of the present invention, uniformity between features is further achieved because the order in which each area of a substrate is exposed may be planned to be the same for all areas of the substrate. In a highly simplified example, FIG. 9 shows the boundaries of image field 120. Within image field 120, the intensity of the beam varies between the four quadrants, quadrants 122, 124, 126, and 128 of image field 120.

Figure 10A:
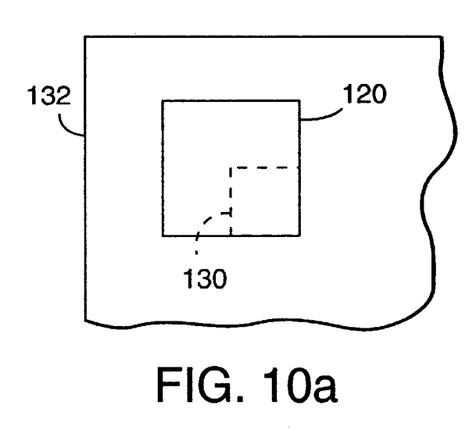
FIGS. 10a–10d show how the present invention improves the uniformity of ablated structures.
Figure 10B:
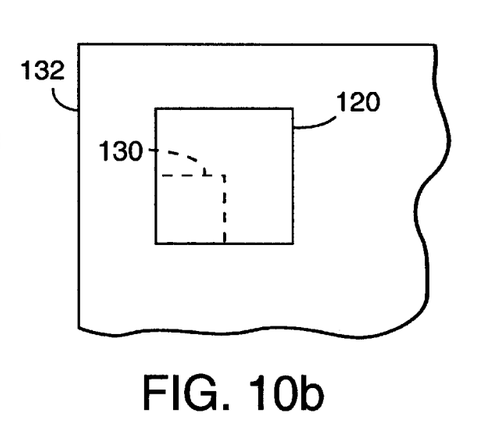
Figure 10C:
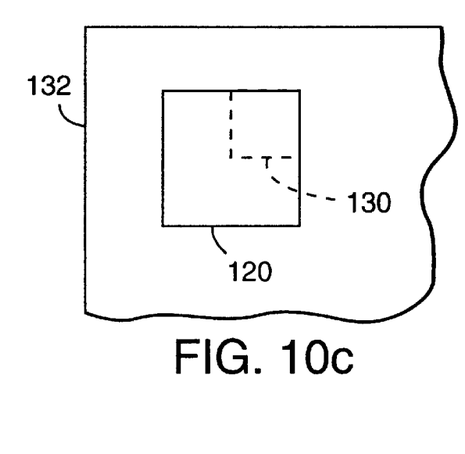
Figure 10D:
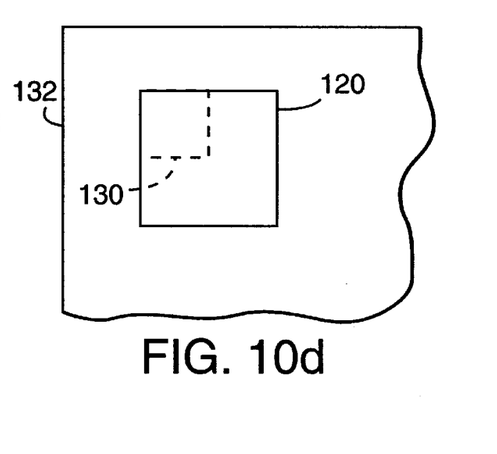

FIG. 10a shows a portion of substrate 132 where an image pattern is first partially exposed within image field 120. Referring back to FIG. 9, area 130 of substrate 132, shown in dotted lines within image field 120, corresponds with fourth quadrant 128 of image field 120. When substrate is moved horizontally and an image pattern is partially exposed for a second time, as shown in FIG. 10b, area 130 of substrate 132 receives a second exposure from a different part of the mask and a different part of the cross-section of the beam, this time corresponding with quadrant 126 of image field 120. After ablation across the row is completed, a second row of ablation may commence. FIG. 10c shows an image pattern being partially exposed for a third time, area 130 of substrate 132 receiving illumination from quadrant 124 of image field 120. Finally, during a fourth exposure, area 130 receives illumination from quadrant 122 of image field 120. Besides the outer borders of substrate 120, the outer border which will receive no illumination and the inner border which will receive insufficient illumination, the rest of substrate 120 will receive illumination in the same order as area 130, namely illumination from quadrant 128 first, quadrant 126 second, quadrant 124 third and quadrant 122 fourth, thereby facilitating uniformity between the ablated features. As shown in FIGS. 10a–10d, the method of the present invention only partially ablates a desired pattern on the edges of the ablated substrate. The borders formed by these partially ablated portions of the substrate typically will not have completed features and may be discarded.

The method of the present invention can further be utilized to create three-dimensional structures in an efficient and cost effective manner. More specifically, the method of the present invention can be used to created stepped patterns. In theory, only stepped patterns can be created if the laser ablation system has infinite resolution. In practice, however, limits in the system such as the resolution of the lens in a laser projection ablation system and the diffraction limit produce curvature on the walls of the ablated features. Moreover, this wall angle can be controlled, thereby allowing the system to create curvature in three-dimensional patterns. To create curved structures, smaller step sizes and lower beam fluence are used.

Figure 11:
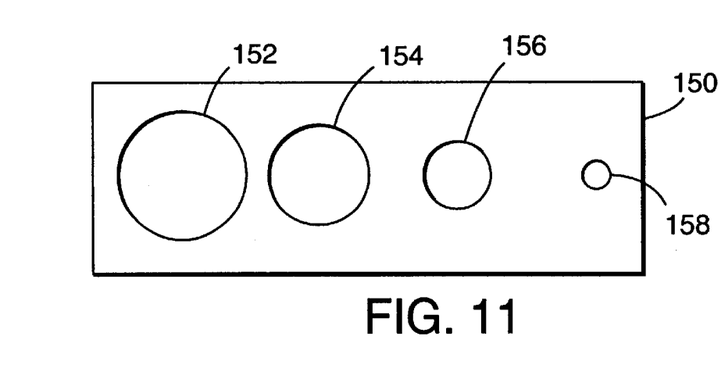
FIG. 11 shows a mask used for creating three-dimensional structures.

To create three-dimensional structures, the desired structure is broken into cross-sectional contours or features. If curved structures smooth to the touch are desired, contours, and therefore step sizes of approximately 10 microns and less are requires. If curved structures smooth to sight are desired, however, step sizes of approximately 0.5 microns and less are required. After determining the number of contours necessary for each structure, the mask is divided into sections, preferably of equal size and equally spaced. Each mask section must be large enough to contain one of the contours necessary to ablate the desired three-dimensional structure. Then each contour is drawn and the mask is produced, each mask section having the necessary contours positioned on appropriate locations on the mask, as will later be described. FIG. 11 shows a portion of a mask 150 having four contours, contours 152, 154, 156, and 158. While the portion of mask 150 shown in FIG. 11 shows four contours used to create a single structure, any number of contours physically able to fit on a mask may be placed on the mask. Moreover, any number identical or different sets of contours able to create a plurality of identical or different repeating or three-dimensional structures may be placed on a single mask.

Figure 12A:
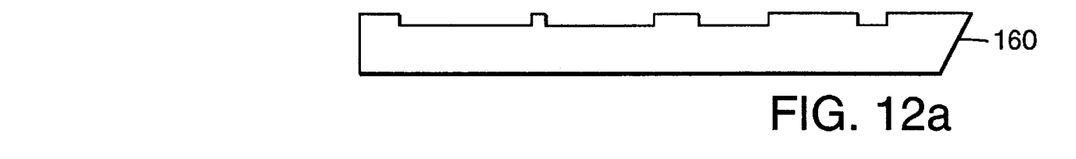
FIGS. 12a–12d shows how the mask shown in FIG. 11 can be used to create three-dimensional structures.

The mask is used to pattern light in a laser ablation system such as the system shown in FIG. 3. Similar to the preferred embodiment for creating uniform repeating structures, the ablation of each contour is preferably performed by exposing the substrate to a single pulse of the laser beam to facilitate debris removal. In such a preferred embodiment, the depth of ablation for a particular contour will correspond to the fluence of the beam. In another embodiment, the substrate is exposed to a plurality of pulses before the substrate is moved such that greater depth of ablation is achieved. In yet another embodiment where greater depth of ablation is desired as well as a lower fluence, subsequent pulses are provided at later passes, rather than at the same step. Further, the entire mask is illuminated. It is not necessary to shutter off unused portions of the mask, thereby wasting illumination from the laser. The resulting exposure after the first exposure is a plurality of different shaped contours, each contour having the same depth, as shown in FIG. 12a.

Figure 12B:
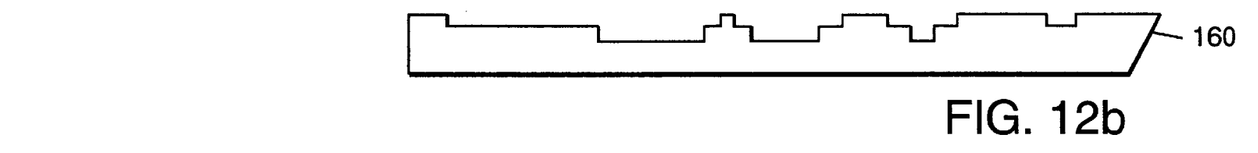

After the first exposure, substrate 160 is moved a distance less than the image field size at the substrate. More specifically, substrate 160 is moved such that the next desired contour is appropriately aligned in relation to the preceding ablated contour. Thus, when the contours are being arranged on the mask, it is necessary to arrange the contours in an order such that they will be ablated in the correct order, as well as in positions such that at each step they will be appropriately aligned. By placing the all the necessary contours at precise locations on the mask the system of the present invention avoids needing multiple masks, mask alignment systems as well as expensive beam alignment systems. FIG. 12b shows a portion of substrate 160 after a second exposure. In FIG. 12b, the same number of pulses were used to create an ablation depth similar to the first exposure, although more or less pulses could be used. Variations on the movement of the substrate are similar to the aforementioned variations described for the purposes of uniformity.

Figure 12C:
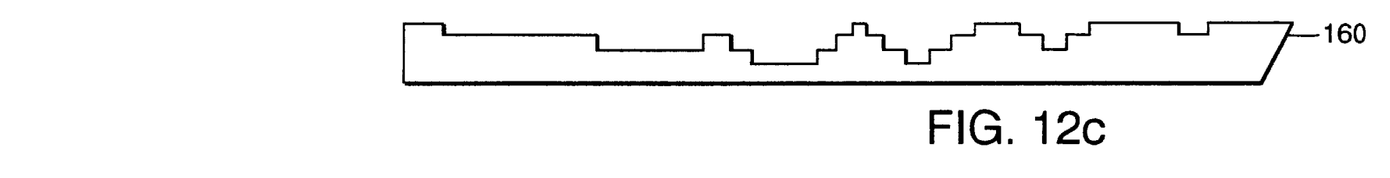
Figure 12D:
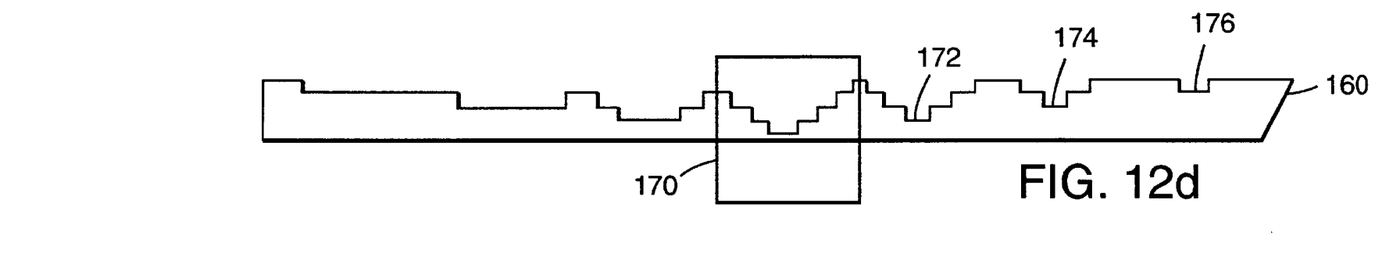
Figure 13:
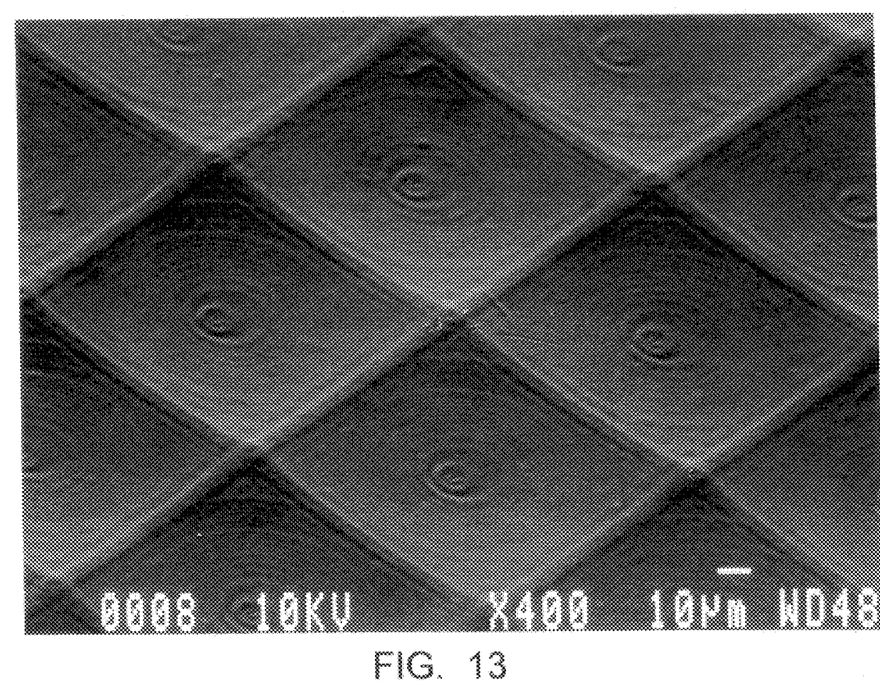
FIG. 13 is a picture of a scanned electron-beam microscope photograph of lenslets using the methods of the present invention.

FIG. 12c shows a portion of substrate 160 after substrate 160 has been moved again and has been exposed a third time. FIG. 12d shows a portion of substrate 160 after moving substrate 160 and a fourth exposure. In FIG. 12d, the structure encloses in box 170 is the first completed structure, possibly a lenslet. When creating some structures, such as lenslets, for example, it may be preferable to first ablate the smallest feature first, such as the feature corresponding to contour 158 of mask 150 and expose the substrate to progressively larger contours. While two specific orders of ablation have been described for creating three-dimensional structures, any order of sizes of features may be arranged based on the desired three-dimensional structure. As shown in FIG. 12d, structures 172, 174 and 176 are incomplete structures. In the method of the present invention, a border of incomplete structures will exist and can be ignored or discarded. FIG. 13 shows an enlarged view of a plurality of lenslets that have been produced using the described method.

Although a preferred embodiment has been illustrated and described for the present invention, it will be appreciated by those of ordinary skill in the art that any method or apparatus which is calculated to achieve this same purpose may be substituted for the specific configurations and steps shown.

This application is intended to cover any adaptations or variations of the present invention. Therefore, it is manifestly intended that this invention be limited only by the appended claims and the equivalents thereof.

What is claimed is:

1. A method of producing a plurality of repeating structures on a substrate wherein said substrate is exposed to radiation through a mask including a plurality of substantially identical patterns each of said patterns corresponding to each of said structures and each of said structures is formed by exposure to radiation through a plurality of said patterns.

2. The method of claim 1 wherein said radiation is emitted by a laser.

3. The method of claim 2 wherein said radiation provides sufficient energy to ablate said substrate.

* * * * *

UNITED STATES PATENT AND TRADEMARK OFFICE
CERTIFICATE OF CORRECTION

PATENT NO. : 6,285,001 B1 Page 1 of 1
DATED : September 4, 2001
INVENTOR(S) : Fleming, Patrick R.

It is certified that error appears in the above-identified patent and that said Letters Patent is hereby corrected as shown below:

<u>Title page,</u>
Item [56], under "OTHER PUBLICATIONS", the fifth reference is a duplicate of the 3$^{rd}$ reference. Therefore, the following reference should be deleted: "Taylor et al., "The effect of debris formation on the morphology of excimer lase ablated polymers", J. Appl. Phys., vol. 64, No. 5, Sep. 1, 1988";

<u>Column 1,</u>
Line 5, "Apr. 28. 1995" should read -- Apr. 26, 1995 --;
Line 35, "nonconformities" should read -- nonuniformities --; and <u>Column 10,</u>
Line 34, "mask the" should read -- mask, the --.

Signed and Sealed this

Eleventh Day of June, 2002

Attest:

Attesting Officer

JAMES E. ROGAN
Director of the United States Patent and Trademark Office